United States Patent [19]

Nicholas

[11] 4,144,414

[45] Mar. 13, 1979

[54] NETWORK SYNCHRONIZATION APPARATUS

[75] Inventor: David C. Nicholas, Cedar Rapids, Iowa

[73] Assignee: Rockwell International Corporation, El Segundo, Calif.

[21] Appl. No.: 871,576

[22] Filed: Jan. 23, 1978

[51] Int. Cl.² .............................................. H04J 3/06
[52] U.S. Cl. .............................................. 179/15 BS
[58] Field of Search .......... 179/15 BS, 15 BY, 15 BF; 178/69.1

[56] References Cited

U.S. PATENT DOCUMENTS

| | | | |
|---|---|---|---|
| 4,042,781 | 8/1977 | Dragotinov | 179/15 BS |
| 4,059,731 | 11/1977 | Green et al. | 179/15 BY |

Primary Examiner—Thomas A. Robinson

Attorney, Agent, or Firm—Bruce C. Lutz; Howard R. Greenberg; H. Frederick Hamann

[57] ABSTRACT

The method of and apparatus for synchronizing all local oscillators in a multinode communication system is disclosed wherein each local oscillator is synchronized to the average frequency of some or all incoming signals from neighboring nodes. This is accomplished by detecting the difference in frequency between the local oscillator and the frequency of incoming signals, averaging these differences, and using the average to adjust the local oscillator. The frequency difference is measured over a period of time and the accumulated difference over the period is checked for reasonableness prior to use. Its use is further delayed after the period of measurement by a period of time while the incoming link is monitored for signal problems which might have occurred toward the end of the accumulation period and which therefore would not have been detected by an immediate reasonableness check.

8 Claims, 3 Drawing Figures

NETWORK SYNCHRONIZATION APPARATUS

THE INVENTION

The present invention is related generally to electronics and more specifically to a method of frequency synchronizing, to each other, the nodes of a multinode network wherein each node has the capability of communicating with one or more other nodes, and even more specifically with the incorporation of a mechanism for detection of transmission errors and failures which might otherwise disrupt the synchronizing system.

In a time division multiplex data or digital voice communication network, the entire network must be operated at a common frequency or data will be lost or false (filler) data must be inserted as it is transmitted from a point operating at one frequency to a point operating at a different frequency. Even in a synchronous network, elastic stores are normally required at the receiving end of all time division multiplexed links in order to absorb phase jitter introduced by the transmission system. In a synchronous network all switching nodes and transmission links operate at a single frequency and thus the phase jitter in received data on any link is bounded such that the elastic stores neither overflow or underflow. If there were no synchronization and the source node clock were faster than the receiving node clock, the elastic store would periodically overflow resulting in deletion of data whereby errors are introduced in the data. If the transmitting node clock were slower than the receiving node clock, then the elastic store would underflow resulting in insertion errors in the received data. Network synchronization as used in this application refers to the general problem of reducing such insertion and deletion errors to an acceptable level.

In the prior art, many approaches have been used to minimize the error problem. One such approach is an asynchronous approach wherein each node contains independent clocks operating at nearly the same rate. The disadvantage of such a system is that even with large elastic stores very accurate, "atomic", clocks are required to minimize errors. Such clocks are expensive, require periodic replacement of the frequency determining element, and by themselves are of sufficient complexity to significantly affect system reliability.

Among the synchronous type systems there is a master slave synchronous network, sometimes referred to as homochronous network, which permits the clock in one node to run free and synchronize all the near neighboring nodes to the free running node using a technique of adjusting a local rate to maintain the elastic store in a half-full condition when data is received from the master node. Although such operations have certain advantages in cost, they also have definite disadvantages when either the master clock fails or some of the internodal links between the master and slave nodes fail. First the failure must be recognized and reported to all network elements and second an alternate node must be designated as master and slave nodes must begin to utilize synchronization information from links to that node. Nevertheless, in certain applications master-slave synchronization is useful and the present invention has applicability in such networks. Moreover, the system in which the invention is realized in the present approach is capable of a form of master-slave operation although that is not the primary intended mode of operation.

The present approach is a mutually synchronous operation mode also referred to as an isochronous network. One approach by the prior art has been to periodically average the contents of several or all of the internodal link elastic stores to determine the rate of the oscillator in each of the nodes such as described in *Journal of Applied Science and Engineering* (1975/76) page 203 by R. Mukundan under the title "Hardware Simulation of Clock Synchronization by Discrete Control Correction." Thus, as a general statement in a mutually synchronous network, the local clock rate is brought into agreement with the average of the observed rates of the neighboring nodes. While there are various methods of obtaining this generalized approach, it is believed that the present approach utilizing a comparison between a detected rate for each of the incoming signals and a local oscillator wherein an up/down counter is operated over a prescribed period of time to obtain a digital output, which may be either positive or negative, and summing all of these outputs to obtain an average which is used to adjust the local oscillator is a unique approach to the problem of a mutually synchronous operation.

A further feature of the present invention is the passage of the count from the up/down counter to an intermediate storage resister where it is held temporarily while a count detector continues monitoring the up/down counter. This feature provides a check on the reasonableness of the data prior to use and thus makes the use of this synchronization approach practical while using real-world transmission links which are unreliable and fail from time to time. For example, if the signal being received has faded, as it is certain to do from time to time when transmission is by microwave radio, the counter will only respond to the difference in frequency between the local oscillator and the free running frequency of the receiving equipment for the link, which in the present case is designed to drift far off network frequency when the link fails or fades. Thus, the counter will quickly reach some maximum limit in response to this large frequency difference and either underflows or overflows.

The counter detector first checks the count for overflow or underflow at the end of the sampling period. The counter detector then transfers the count to an intermediate register for storage prior to use and continues to check the up/down counter for a short period of time after transfer of the count to the intermediate register. If the count limits are not exceeded within a prescribed time, the data is reasonably assumed to be correct and is further transferred from the intermediate register to a work register for use in the servomechanism. If, on the other hand, the count limits are exceeded, the data is not transferred and the last previous valid data from the work register is used to adjust or maintain adjustment of the local oscillator used in determining the data rate of transmitted signals. While the example of signal fade is used in the error detection described, other problems such as the received signal being far off synchronization due to, for example, equipment failure at the distant node, can also be detected by the present technique.

It is thus an object of the present invention to provide an improved mutual synchronization system.

Other objects and advantages of the present invention may be ascertained from a reading of the specification and appended claims in conjunction with the drawings wherein:

DETAILED DESCRIPTION

Figure 1:
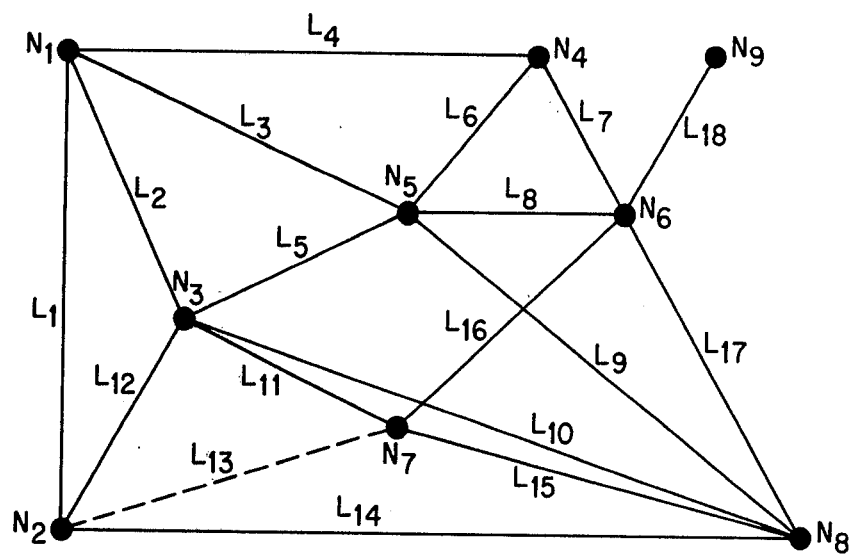
FIG. 1 is a line drawing illustrative of a system of communication nodes.

In FIG. 1 an illustration is provided of a possible system configuration having nine nodes numbered from 1 through 9 and with all but one of the nodes having multiple links or connections with other nodes. The links are labeled from L1 to L18. L13 is shown in dash line configuration to illustrate that this particular link is presently not operational either due to fade, or for some other reason such as line breakage, radio failure, etc.

There is no particular significance to the exact structure of FIG. 1, and the network is designed to achieve a common frequency as long as each node is connected to at least one other and all nodes are connected. Even if the network should split into two or more sections because of a failure of all links between the pieces, then each section operates separately. In the example of FIG. 1, node N2 continues to operate based on information from nodes N1, N3, and N8 over links L1, L12 and L14 in spite of the failure of link L13, which in most cases is detected by the instant invention before any erroneous data is used at either node N2 or N7. The link L18 connecting node N9 to N6 illustrates that nodes require only one link. If this single link should fail, the detection mechanism of the instant invention will detect the failure before erroneous data is used, and the local oscillator at N9 will continue to operate at nearly the network frequency, subject to the short term stability of the unit. Traffic local to node N9 proceeds normally and communication with the remainder of the network is resumed when the link L18 is restored. During restorations, a somewhat larger reasonableness test period may be used before the new data is accepted as valid to provide assurance that correct operation has in fact been restored.

The same mechanism is, of course, operative upon initial connection of the network.

The ability of a network to achieve synchronization automatically as sections are connected or reconnected is referred to as a selforganizing capability.

In the initial connection situation, or when the network is restored after having been broken in separate sections for some time, it is important that the invention be able to easily discriminate between the free running frequency of the receiving equipment of a failed link and the frequency of another section of the network as received over a correctly operating link. Accordingly, the free running frequency of the receiving equipment within a failed link is designed to be much higher or lower than the nominal network frequency, while the free running frequency of the local oscillator at each node is designed to be within a narrow range. Therefore, the reasonableness check applied upon initial connection or reconnection after a failure has the effect of prohibiting the utilization of data if the received data indicates that the received frequency differs by too much from the local oscillator, which it always will if the received frequency is that of the free running receiver of a failed link.

Figure 2:
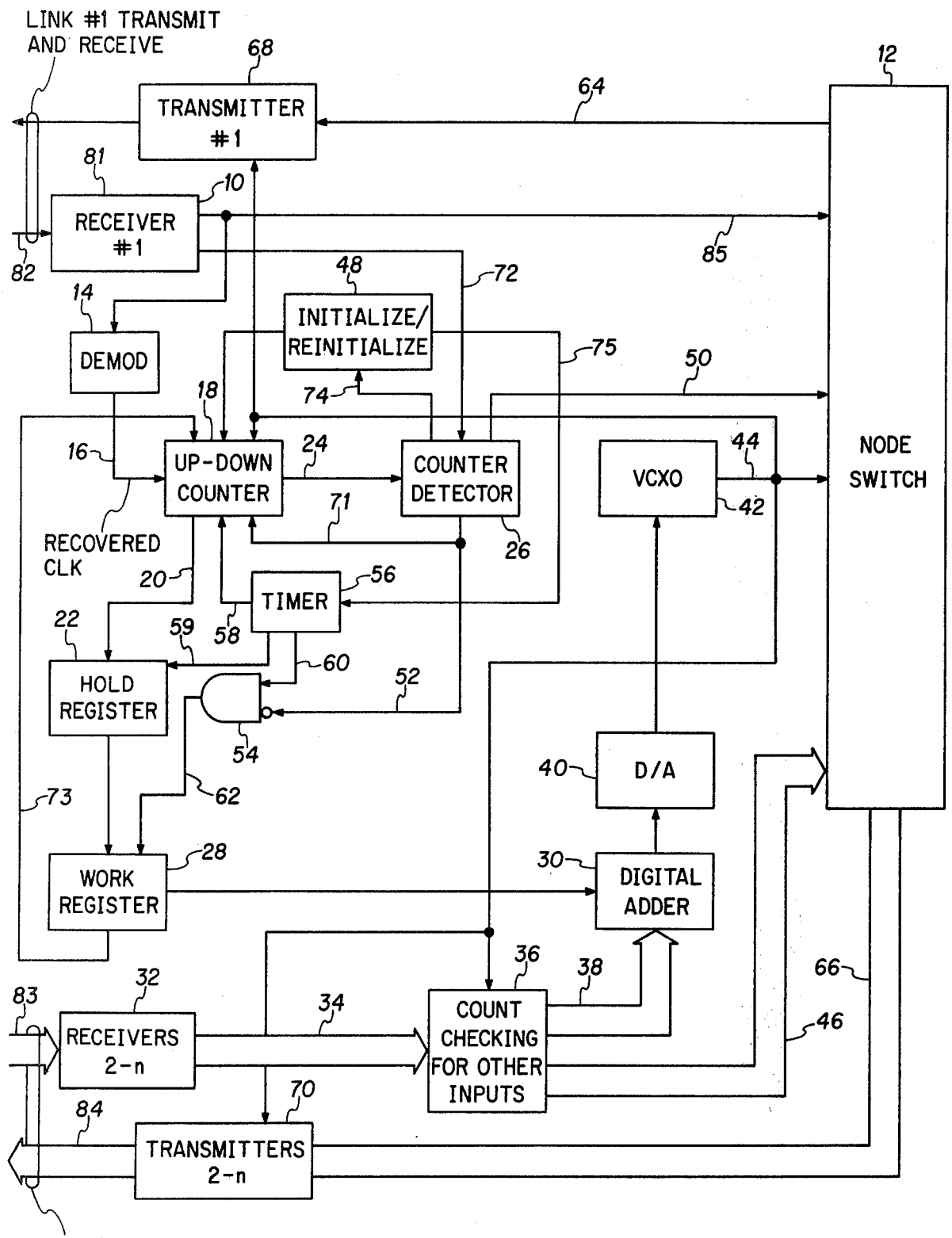
FIG. 2 is a block diagram of the electronics required for practicing the invention at one node.

In FIG. 2 a receiver 10 for link or channel #1 having a receive channel 82 is illustrated as providing signals to a node switch 12 as well as to the input of a demodulator 14. The node switch 12 illustrated here may be a telephone switching exchange, data switching system, or any device requiring operation at a common network frequency. The present invention is not concerned with the use of the data transmitted on the link subsequent to reaching the node switch. The demodulator 14 provides signals on a lead 16 to an up/down counter 18 which provides output signals on lead 20 to a hold register 22 and on a lead 24 to a counter detector 26. The hold register 22 provides output signals to a work register 28 which outputs signals to a digital adder 30. A plurality of further receivers from 2 through n receiving signals from the receive sections of the additional links 83 is illustrated by a block 32 and this block provides a plurality of signals on leads 34 similar to the signals on the lead extending from receiver 10 to demodulator 14 to a block 36 for checking the data rate of signals received by receivers 32 in a manner illustrated in more detail in connection with channel #1. The input signals on leads 34 are output by block 36 on a plurality of leads 46 to the node switch 12 as is the signal from receiver #1 on lead 85. Leads 46 also include the alarm signals output from the counter detector for channels 2 through n within block 36. These signals correspond to that of lead 50 illustrated in detail for channel 1. The outputs obtained upon checking are supplied on a plurality of leads 38 similar to that between blocks 28 and 30, to digital adder 30. The various signals are added in block 30 and supplied to a digital-to-analog converter 40 which is used to apply control signals to a variable frequency oscillator 42. Variable frequency oscillator 42 supplies output signals on a lead 44 to the up/down counter 18, the node switch 12 and the similar circuitry serving the other inputs of block 36. It should be noted that the instant invention is useful and may be practiced at nodes, such as node 9 of FIG. 1, which have only one link, and thus it is necessary to illustrate in detail only the common blocks and the equipment for one link as the equipment for each link is similar. An initialization block 48 is used to supply signals to block 18 to reset it to a given count between each set of sampling times. The counter detector 26 is used to detect overflow or underflow (exceeding of predetermined limits) of counter 18 and provide an output indication thereof on lead 50 to node switch 12 and also on a lead 52 to an AND gate 54. A timer block 56 provides timing signals to counter 18 on a lead 58, to hold register 22 on lead 59, and on a lead 60 to gate 54. The output of gate 54 is applied on a lead 62 to work register 28 for passing the signals in register 22 to register 28.

Signals received by node switch 12 for transmission to other nodes are output both on a lead 64 as well as a plurality of leads 66. Lead 64 is connected to a transmitter 68 for transmission to the node on a transmit channel 81 of link #1 from which receiver 10 is receiving data on the receive channel 82 of link #1. The leads 66 are connected to a plurality of transmitters 2 through n and labeled as 70. These transmitters 68 and 70 likewise supply signals to corresponding nodes from which receivers 32 are receiving their data. Transmission is at a rate determined by the oscillator 42 via a clock input on lead 44. A lead 72 supplies additional error signals from receiver 10 to counter 26. The work register 28 also supplies initialization count signals on a lead 73 to up/down counter 18. The counter detector 26 supplies failure condition signals on lead 74 to the initialization/reinitialization block 48. Finally, the initialization block 48 supplies timing control signals on lead 75 to timer 56.

Since all of the blocks shown in FIG. 2 are very standard blocks, it is believed unnecessary to provide a detailed circuit diagram of each one. The receivers 10 and 32 are standard communication receivers and may be either of the type to work with solid lines or to receive signals through the atmosphere. In any event, the demodulator 14 through the use of any technique such as a phase lock loop removes the timing information from the received data and supplies this in the form of pulses to the up/down counter 18 as a series of recovered clock pulses. Counter 18 may comprise a pair of chips such as 74 LS 193 by National Semiconductor Corp. These pulses actuate the counter 18 to count in a given direction. Pulses received on lead 44 from the local oscillator 42 actuate counter 18 to count in the opposite direction. The initialize block 48 may be any device for setting the counter 18 to a prescribed count such as a count halfway between the minimum and maximum value at the start of each counting cycle. The counter detector 26 may be merely a plurality of digital counter detectors each using multiple input AND gates and inverters to provide outputs when a given count such as zero is detected, and outputs when further counts such as the maximum and minimum count of counter 18 are detected. Alternatively, a comparator such as a 74 LS 85 chip by National Semiconductor Corp. may be used. Each of these occurrences will provide an output on leads 50 and 52 signifying that an error condition is in evidence. This error condition is fed back to the counter 18 via lead 71 and is used to inhibit further counting. Thus, once an error condition, that is a maximum or minimum count, occurs, the count in work register 28 remains fixed until reinitialization. The timer 56 provides signals at, for example, one second intervals at which times the count in the counter is stored in the hold register 22. The number inserted therein is indicative of the count difference between the recovered clock on lead 16 and the local oscillator signals received on lead 44. The digital number is held in hold register 22 (such as a 74 LS 174 by National Semiconductor Corp.) for a prescribed period of time such as 0.1 second to see if in actuality a problem has occurred so that the up/down counter is close to overflowing or underflowing. If an amount of time is used such that the oscillator 42 would cause overflow in counter 18 with no inputs on lead 16 and during that time overflow has not occurred, it is deemed that a failure did not occur just at the end of the period. The information is valid and is therefore passed to work register 28 (this also may be a 74 LS 174).

No distinction is made between failures occurring during the one second period and failures which occur during the subsequent 0.1 second period, but the purpose of the extended 0.1 second period is to detect failure just beginning to occur at the end of the one second period.

FIG. 2 also illustrates that a signal from the receiver indicating an error detected by the receiver may be transmitted to block 26 along signal path 72. Such an error signal may or may not be available from all receivers and is likely to be less a reliable indication of signal loss than a limit count in the counter. Nevertheless, if such a signal is available it may be used by the block 26 to prohibit use of the count just as the counter limit signals are used.

When a failure is detected, then the work register 28 is not updated. And the initialization/reinitialization circuit or block 48 is informed of the failure condition via signal path 74 from the counter detector 26. The up/down counter 18 is reinitialized with the contents of register 28 via signal path 73 under control of the initialization/reinitialization block 48, and the process proceeds through subsequent time periods until such time as the up/down counter 18 remains within its limits. During this period of time in order to improve the reliability of the determination that receipt of a valid signal has been reestablished, it is desirable to extend the periods to, for example, 5 seconds. This is done by block 48 by signals to the timer 56 on lead 75.

Register 28 thus always contains the error-free count. The content of register 28 is received by adder 30 and is added to all the rest of the numbers obtained from count checking block 36 and the resulting number is divided or otherwise adjusted by the number of received signals and supplied through the digital-to-analog converter 40 to the control input of the variable frequency oscillator 42 to adjust its frequency to the average of all the received signals.

OPERATION

While the operation of the invention is substantially apparent from the above detailed description, the following is provided for a more complete disclosure.

The incoming signal has data bits occurring at a given rate. The rate is recovered by a demodulator 14 and used to provide a series of pulses indicated as recovered clock on lead 16 and applied to up/down counter 18. This counter is initialized to a given centralized or intermediate number by block 48 and is driven in the countdown direction by demodulated clock signals on lead 16 and in the countup direction by the local oscillator 42. Note that oscillator 42 is used to determine the rate of all output communications going to other parts of the multinode network via transmitters 68 and 70. The count in counter 18 is supplied to hold register 22 a prescribed time period $t_1$ after it is initialized. The count in hold register 22 is indicative of the difference in frequency between that received on receiver 10 and the frequency of the variable frequency oscillator 42 and is a relative indication of data rate on that channel versus the system frequency. The count is held in hold register 22 for a time $t_2$ necessary to show that errors have not occurred in the count due to the fact of fade near the end of the counting period. If fade has occurred and continued, the count of counter 18 would have reached the predetermined limits as detected by detector block 26 during the period $t_1$ or the subsequent period $t_2$. The occurrence of an over or underflow condition in counter 18 prior to the expiration of the time period $t_1 + t_2$ would prevent passage of the digital word to work register 28 and whatever previous number had been passed to work register 28 would be used by adder 30 in conjunction with the other input signals from similar work registers in receivers 32. These would then be averaged and used to adjust block 42 as if the number within block 28 is still valid. As may be ascertained, if the number in hold register 22 is very large and was permitted to be added to the remaining numbers from receivers 32, the error indication to oscillator 42 could be substantial and have very deleterious effects as regards the frequency stability of the entire network of FIG. 1.

In a current version of the invention, all time periods $t_1$ are of duration one second and all time periods $t_2$ are of duration 0.1 second.

Figure 3:
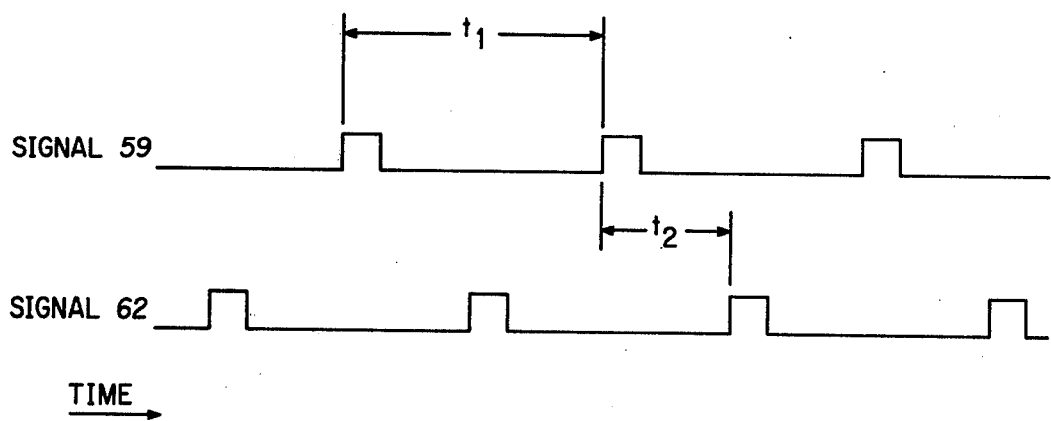
FIG. 3 is a presentation for use in explaining the operation of FIG. 2.

The entire process is repeated each time period $t_1$. The relationship of $t_1$ and $t_2$ may be understood by reference to FIG. 3 which illustrates the signals on leads 59 and 62 which cause data to be loaded into registers 22 and 28 on the rising edge of each pulse. In the event an error is detected during the interval $t_1 + t_2$ prior to the time a pulse on lead 62 normally occurs, then that error is indicated on lead 52, the pulse on lead 62 is inhibited by gate 54, the data in register 28 remains unchanged, and the system reinitializes the counter as described above.

Thus, errors are detected prior to their result being loaded into register 28. Thus the number added by adder 30 for that channel is the last valid number as held by work register 28.

While I have illustrated a preferred embodiment of my invention, I wish to be limited only to the mutual synchronization concept and associated error detection scheme as defined by the appended claims included herewith and wherein I claim:

1. Node apparatus for use in a network of data transmission units each of which may receive and transmit data from and to one or more other nodes each of which contains a local oscillator which may need to be adjusted toward a common system frequency comprising, in combination:
   a plurality n of channel units each including;
      first means for receiving digital data,
      clock recovery means connected to said first means for generating a recovered clock signal indicative of the digital rate of incoming data,
      second means for receiving a local clock signal,
      up/down counter means connected to said clock recovery means and said second means for receiving local clock signals therefrom, said counter means counting in one direction from an initial count for each local clock pulse received and counting in the opposite direction for each recovered clock pulse received,
      count limit detection means connected to said counter for providing an output when the count exceeds predetermined limits,
      register means for, upon command, outputting a digital signal indicative of the count of said counter means, and
      timing means, connected to said count limit detection means and said register means, for commanding the count to be output only when a count limit is not exceeded within a prescribed time;
   digital adder means connected to said register means for each of said n channel units for receiving the digital signals therefrom and for outputting a signal indicative of the sum of the signals received; and
   variable frequency oscillator means connected to said digital adder means for receiving the output signal therefrom, said oscillator means providing a local clock pulse signal to said second means.

2. Apparatus as claimed in claim 1 comprising, in addition:
   a plurality of transmission means each connected to said oscillator means for transmitting data at a rate determined by the frequency of operation of said oscillator means.

3. A mutual synchronization system for a plurality of stations each of which receives digital information from a plurality of other stations and each of which includes means for preventing erroneous alterations in average system frequency due to microwave fade and the like comprising, in combination:
   a plurality of digital data transmitting means each of which transmits data occurring at a rate determined by a local timing means;
   a plurality of digital data receiving means for demodulating data to be retransmitted or otherwise acted upon, each of said data receiving means including,
      local frequency controllable timing means including timing signal output means and timing signal control input means; and
      count means for determining the frequency difference between the local timing means and each of a plurality of received signals and including output means for supplying count signals indicative of the frequency difference; and
   summing means, connected to said output means of each of said count means and to said control means of said local timing means for algebraically summing the input signals received and outputting a signal indicative of the average thereof to control the frequency of operation of said local timing means.

4. Apparatus as claimed in claim 3 wherein said count means additionally includes:
   holding register means including control means, for receiving a count at periodically occurring points in time of period $t_1$;
   working register means connected between said holding register means and said output means of said count means;
   timing means, connected to said control means of said holding register means for providing signals to pass a count signal from said holding register to said working register after a time period $t_2$ subsequent to each of the periods of duration $t_1$;
   count detection means for checking the magnitude of the count, connected to said holding register, for preventing passage of the count from said holding register to said working register when the count signal exceeds predetermined values.

5. Apparatus for checking the "reasonableness" of data to be used in a feedback system comprising, in combination:
   source means for providing a count indicative of the frequency difference between an input frequency and a local reference;
   first storage means connected to said source means, for storing counts from said source means in a hold condition;
   second storage means, connected to said first storage means, for holding counts received therefrom in working condition until a new count is transferred thereto; and
   count detection means, connected to said source means and to said first storage means, for passing the count stored by said first means to said second means only if the count from said source does not exceed predetermined limits.

6. Apparatus for checking the "reasonableness" of data to be used in a feedback system comprising, in combination:
   source means for providing a count indicative of the frequency difference between an input frequency and a local reference;
   first storage means connected to said source means, for storing counts from said source means in a hold condition;

second storage means, connected to said first storage means, for holding counts received therefrom in a working condition until a new count is received; and count detection means, connected to said source means and to said first storage means, for passing the count stored by said first means to said second means only if the count from said source means does not exceed prescribed limits by a predetermined time period $t_2$ after sampling.

7. The method of checking before use for incorrect data due to signal fade of an incoming signal wherein a recovered clock is derived from the incoming signal and is compared with a local reference clock by means of a counter which accumulates the difference between the two clocks, and wherein before transferring a count from said counter to a register indicative of the difference in clock rate between the recovered and local clock the method comprises the steps of:

checking the count of the counter for a prescribed time after the transfer; and using the transferred count only if predetermined count limits are not exceeded within the prescribed time.

8. The method of checking before use for incorrect data due to signal fade of an incoming signal wherein a recovered clock is derived from the incoming signal and is compared with a local reference by means of a counter which accumulates the difference between the two clocks and wherein before transferring a count from said counter to a register indicative of the difference in clock rate between the recovered and local clock the steps are comprised of:

sampling the count of the counter; and transferring the count for subsequent use only if predetermined count limits are not exceeded by the sampling time.

* * * * *